(No Model.)
W. F. SMITH.
CONNECTOR FOR BATTERIES.
No. 412,346. Patented Oct. 8, 1889.
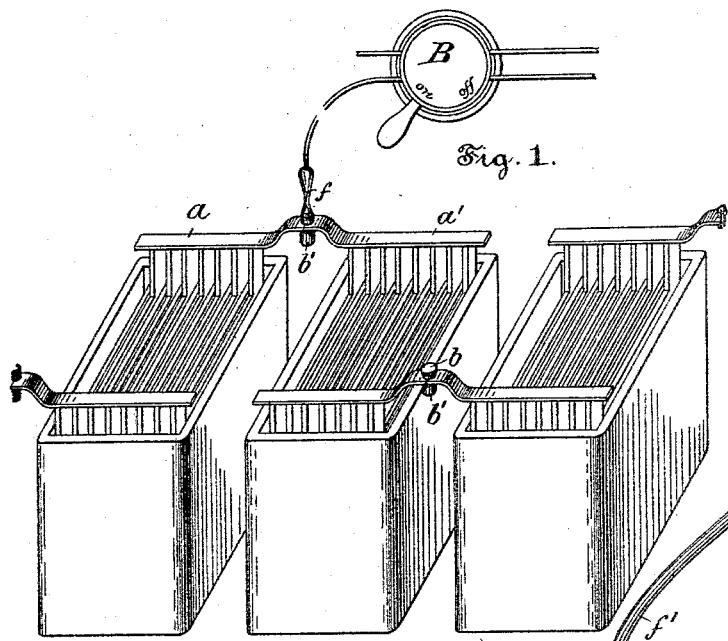
Fig. 1.
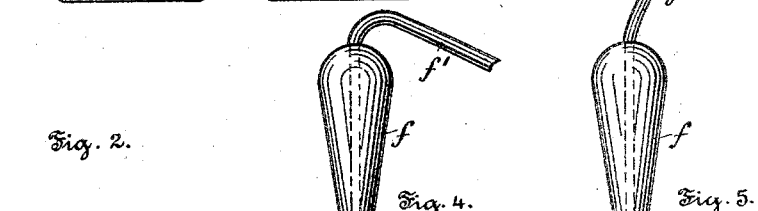
Fig. 2. Fig. 4. Fig. 5.
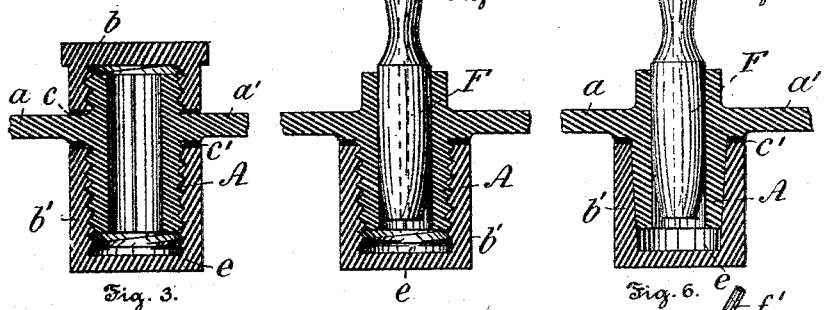
Fig. 3. Fig. 6.
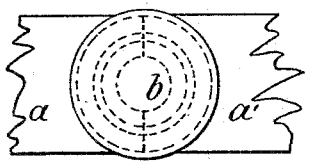
Witnesses:
Hermann Bormann.
Thomas M. Smith.
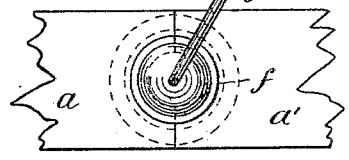
Inventor:
Walter F. Smith,
by J. Walter Douglass.
Att'y.

UNITED STATES PATENT OFFICE.

WALTER F. SMITH, OF PHILADELPHIA, PENNSYLVANIA, ASSIGNOR TO THE UNITED ELECTRIC IMPROVEMENT COMPANY, OF GLOUCESTER CITY, NEW JERSEY.

CONNECTOR FOR BATTERIES.

SPECIFICATION forming part of Letters Patent No. 412,346, dated October 8, 1889.

Application filed April 19, 1889. Serial No. 307,780. (No model.)

*To all whom it may concern:*

Be it known that I, WALTER F. SMITH, a citizen of the United States, residing at the city of Philadelphia, in the county of Philadelphia and State of Pennsylvania, have invented certain new and useful Improvements in Devices for Connecting the Plates of One Electric Battery with Another Battery or Batteries and with a Switch-Board or Transmitting Device, of which the following is a specification.

My invention in general relates to improvements in devices for connecting a series of plates or electrodes forming one electric battery with the plates or electrodes of another electric battery or batteries, and the invention is also applicable to primary batteries as well as to secondary or storage batteries.

The principal object of my invention is to provide a connecting device of high electrical conductivity, simple in construction and durable, and effective in action, and one that will not become corroded by the gases evolved during the operation of the battery or batteries, or during the process of reduction of the plates to "form" such battery or batteries.

A further object of my invention is to provide a connecting device to not only serve as a terminal connection from a battery to a switch-board or transmitting device, but also as a convenient and efficient means whereby plates or elements of one battery may be connected with those of another battery or batteries.

A further object of my invention is to provide a connecting device which by its construction and its mode of application to electric batteries will prevent terminals of like polarity from being connected together.

My invention consists of a connecting device having a divided male thimble provided with strips or ribbons, and having a cap and a female thimble fitted to the respective ends thereof, the said female thimble being secured to said male thimble so as to leave a space between the two thimbles for the introduction of mercury or other suitable material, whereby a continuous path for the passage of the electric current or currents through the device to the battery or batteries is insured.

My invention further consists of a divided male thimble having a cup or female thimble and a plug with a flexible conductor leading to a switch-board or transmitting device.

The nature of my invention will be more fully understood taken in connection with the accompanying drawings, forming part thereof, and in which—

Figure 1 is a perspective view of a series of cells of a secondary or storage battery with my invention shown in application thereto—that is, on the right-hand side thereof the device is shown in connection with the plates forming one cell of the battery with those forming the other cell of the battery, and at the left-hand side, in the rear of said view, the device is arranged to serve as a terminal connection of the plates of a cell or cells with a switch-board or other transmitting device. Fig. 2 is a vertical central section of the connecting device, on an enlarged scale, arranged to connect the plate or plates of one cell with the plate or plates of another cell of an electric battery, and showing also the internal annular space for the reception of mercury or other material, and the gasket or gaskets interposed between the upper cap and the lower cup, and the ribbons or strips connected or formed integral with the divided male thimble. Fig. 3 is a plan view showing the ribbons or strips connected with the divided male thimble broken away. Fig. 4 is a vertical central section of the device, showing the upper cap removed and a plug provided with a flexible conductor fitted into the male thimble and arranged to connect the plates forming a cell or cells of one electric battery with a switch-board or other transmitting device. Fig. 5 is a vertical central section of the connecting device, showing the divided tapering male thimble and the female thimble suitably fitted or secured thereto; and Fig. 6 is a plan view of the connecting device of Fig. 5, provided with a plug having a flexible conductor for connecting the plates or elements of a battery or batteries with a switch-board or other transmitting device.

Referring to the accompanying drawings, and more particularly to Figs. 2 and 3, A is a vertically-divided male thimble having the exterior surface threaded and provided with lateral strips or ribbons $a$ and $a'$, which are shown broken away near said thimble, but in practice are extended and connected with the plate or plates forming a cell or cells of an electric battery or batteries, in the manner, for example, shown in Fig. 1. This male thimble A has secured thereto an upper cap $b$ and a lower female thimble or cup $b'$, made of metal or other suitable material. The said cap and thimble are provided with threaded interior surfaces corresponding with the threaded surface of the male thimble A. Between the lateral ribbons or strips $a$ and $a'$ of the male thimble A and the upper cap $b$ or lower female thimble or cup $b'$, or both, are interposed gaskets $c$ and $c'$, made of rubber or other suitable material, in order that a tight joint may be made between said cap or cup and the lateral ribbons or strips $a$ and $a'$ of the male thimble A, or both, to prevent the gases evolved during the operation of the battery from corroding the same, and also for permitting of the free passage of the electric current or currents through the connecting device to the plate or plates forming the cell or cells of the electric battery or series of batteries coupled together. In the internal annular space $e$, formed or left between the lower extremity of the male thimble A and the base of the lower cup $b'$, is introduced mercury or other suitable material to increase the electrical conductivity of the device, as well as to afford a perfectly free passage for the current or currents through the device to the batteries.

Referring now to Fig. 4, which shows another form of the device, consisting of a divided male thimble having lateral strips or ribbons $a$ and $a'$ for connecting one series of plates mounted in battery with a similar series of plates forming another battery or batteries, as in Fig. 1, this divided male thimble A has its lower exterior surface threaded, and to which is applied a female thimble or cup $b'$. An annular space is formed between the internal base of the cup $b'$ and the lower extremity of the male thimble A, forming a chamber for the reception of mercury or other suitable material.

Into the male thimble A is introduced a plug F, made of rubber or other suitable insulating material, having a handle $f$ and a flexible conductor $f'$ to permit of the passage of the current or currents from a battery or batteries to a switch-board or other transmitting device B, as shown in Fig. 1.

In Figs. 5 and 6 is shown another form of the device provided with a vertically-divided male thimble A, having lateral strips or ribbons $a$ and $a'$. This male thimble A has a plain upper surface and a tapering lower portion, to which is fitted a female thimble or cup $b'$, the diameter of which increases gradually from the bottom to the top thereof. The female cup $b'$ is so connected with the male thimble A as to leave an annular space $e$ between the two parts for the introduction of mercury or other material for not only increasing the electrical conductivity of the device, but also for insuring the free passage of the current or currents from a series of plates forming the cells of one battery through the connecting device to a series of plates forming the cells of another battery or batteries. Between the cup $b'$ and the lateral ribbons or strips $a$ and $a'$ of the male thimble is interposed a gasket $c'$, made of rubber or other suitable insulating material, for insulating the respective parts from each other, as well as avoiding corrosion of the parts of the device. Into the male thimble A is introduced a plug F, having a handle $f$, of insulating material, and a flexible conductor $f'$ for permitting of the passage of the electric current or currents from a battery or batteries to a switch-board or suitable transmitting device B.

The lateral strips or ribbons of the divided male thimble may be connected to the lugs or terminals of the plates forming the cell or cells of one battery with those of the other battery or batteries by means of clamps; but I prefer to burn the lateral strips or ribbons $a$ and $a'$ of the device onto the respective lugs or terminals, because excellent results are thereby obtained, and then from an economical standpoint I prefer this mode of connection of said strips or ribbons with the lugs or terminals of the respective plates forming the cell or cells of the electric battery or batteries.

I have described my invention in its application more particularly to secondary or storage batteries; but it is manifestly obvious that the device can be advantageously used for connecting or coupling together the cells of primary batteries.

Having thus described the nature and objects of my invention, what I claim as new, and desire to secure by Letters Patent, is—

1. The herein-described device for connecting electric batteries, consisting of a vertically-divided male thimble having lateral strips attached to each half thereof, a female thimble, and a cap fitted to the ends of said male thimble and said female thimble, adapted to receive a material for preventing interruption of the current through the same, substantially as and for the purposes set forth.

2. The herein-described device for connecting electric batteries, consisting of a male thimble having strips attached thereto, a female thimble, gaskets interposed between said female thimble and strips, and said thimble adapted to receive and hold mercury, substantially as and for the purposes set forth.

3. The herein-described device for connecting electric batteries, consisting of a male thimble having lateral strips and with a female thimble secured thereto, and a plug mounted in said male thimble with a conductor, substantially as and for the purposes set forth.

4. The herein-described device for connecting electric batteries, consisting of a male thimble having secured thereto a cup capable of containing mercury or other material, a gasket interposed between said cup and lateral strips formed integral with said male thimble, and a plug having a flexible conductor, substantially as and for the purposes set forth.

5. The herein-described device for connecting electric batteries, consisting of a divided male thimble having a tapering lower portion and lateral strips or ribbons, a female thimble fitting snugly onto said male thimble, and a plug connected with said male thimble having a flexible conductor, substantially as and for the purposes set forth.

6. The combination of two or more batteries, each composed of a series of plates or elements having lugs or terminals connected with a device consisting of a male thimble provided with lateral strips or ribbons, a cap and a cup secured to the respective ends of said thimble, and said cup adapted to receive a material for preventing the interruption of the electric current or currents through said device.

7. The combination, with two or more batteries, of a device consisting of a male thimble with strips, a cup secured to said thimble, and a plug having a flexible conductor connected with a switch-board or transmitting device, substantially as and for the purposes set forth.

8. The combination, with two or more batteries, of a device having a male thimble with lateral strips, a female thimble, a gasket or gaskets interposed between said strips and female thimble, and said female thimble arranged in connection with said male thimble to receive and hold mercury or other material, and a plug having a flexible conductor, substantially as and for the purposes set forth.

In witness whereof I have hereunto set my signature in the presence of two subscribing witnesses.

WALTER F. SMITH.

Witnesses:
  GEO. W. REED,
  THOMAS M. SMITH.